(12) United States Patent
Yang

(10) Patent No.: US 8,432,535 B2
(45) Date of Patent: Apr. 30, 2013

(54) OPTOELECTRONIC RANGE FINDER

(75) Inventor: Dezhong Yang, Nanjing (CN)

(73) Assignee: Chervon Limited, Hong Kong (HK)

( * ) Notice: Subject to any disclaimer, the term of this patent is extended or adjusted under 35 U.S.C. 154(b) by 145 days.

(21) Appl. No.: 12/872,030

(22) Filed: Aug. 31, 2010

(65) Prior Publication Data
US 2011/0051122 A1  Mar. 3, 2011

(30) Foreign Application Priority Data
Sep. 1, 2009 (CN) .......................... 2009 1 0034550

(51) Int. Cl.
*G01C 3/08* (2006.01)

(52) U.S. Cl.
USPC .......... 356/5.05; 365/4.01; 365/5.01; 365/5.1

(58) Field of Classification Search ........ 356/3.01–3.15, 356/4.01–4.1, 5.01–5.15, 6–22, 28, 28.5
See application file for complete search history.

(56) References Cited

U.S. PATENT DOCUMENTS

| 3,588,253 | A | * | 6/1971 | Wittmann | 356/425 |
| 5,949,531 | A | * | 9/1999 | Ehbets et al. | 356/5.01 |
| 6,917,415 | B2 | | 7/2005 | Gogolla et al. | |

* cited by examiner

*Primary Examiner* — Luke Ratcliffe
(74) *Attorney, Agent, or Firm* — Greenberg Traurig, LLP

(57) ABSTRACT

A device for optoelectronic distance measurement includes an emitter having a first end for emitting a measuring beam to an object to be measured and a second end, a receiver for receiving the measuring beam reflected or dispersed back from the object to be measured and for converting it to a measurement signal, a signal processing device for filtering the measurement signal and a reference signal, and a control and analysis device for analyzing the information of the measurement signal and the reference signal so as to determine the distance from the object to be measured. The second end of the emitter is used to emit a reference beam which is received by the receiver and converted to form the reference signal.

17 Claims, 2 Drawing Sheets semiconductor laser module in the prior art

OPTOELECTRONIC RANGE FINDER

RELATED APPLICATION

This application claims the benefit of CN 200910034550.4, filed on Sep. 1, 2009, the disclosure of which is incorporated herein by reference in its entirety.

BACKGROUND

Optoelectronic range finders are widely used in the field of architecture, indoor decoration, and the like due to their ability to provide high measurement accuracy. Such devices typically include an emitter which emits modulated beams that may be reflected or dispersed by an object to be measured and an optoelectronic receiver. Currently, there are two methods for measuring the distance between the optoelectronic range finder and the object to be measured. One method is based on the phase measurement principle which determines the distance between the optoelectronic range finder and the object to be measured by using the phase difference between the modulated beams that are emitted and then received by the optoelectronic receiver. The second method is based on the flight time principle which calculates the distance of the object to be measured by using the flight time delay of the modulated beam when received by the optoelectronic receiver relative to when emitted from the emitter.

The measurement accuracy of such optoelectronic distance measurement devices may, however, be affected by the environment and the device itself, e.g., a temperature change in the environment and/or a temperature drift of the optoelectronic receiver. Accordingly, the phase drift due to the temperature change in the environment and/or the temperature drift of the optoelectronic receiver is currently eliminated by setting an inner reference optical path with a predetermined length within the optoelectronic distance measurement device. By way of example, U.S. Pat. No. 5,949,531 discloses a system wherein the emitting optical path is provided with a mechanical converting device for switching the modulated beams emitted from the emitter between an outer optical measurement path and an inner reference optical path whereby the modulated beams transmitted through the outer optical measuring path and the inner reference optical path may be received by the optoelectronic receiver successively to thereby generate a low frequency measurement signal and a low frequency reference signal, respectively. The measurement error of the distance measuring device may then be eliminated by the subtraction of the phases of the low frequency measurement signal and the low frequency reference signal. This method may be performed many times in one measuring process whereby the measurement signal and the reference signal alternatively enter into the optoelectronic receiver by means of the mechanical converting device. However, the currently utilized mechanical converting device may experience a large mechanical load with a result that the mechanical converting device tends to become worn and damaged during the process. Moreover, the mechanical converting device complicates the inner structure of the distance measuring device, increasing the manufacturing cost as well as the size and the weight of the distance measuring device which is not helpful for the miniaturization development of the distance measuring device.

By way of further example, U.S. Pat. No. 6,917,415 discloses a system wherein the emitting optical path is provided with a spectrometer device for dividing the modulated beams emitted from the emitter into two portions. One portion of the modulated beams is projected to the object to be measured through the outer optical measurement path and the other portion of the modulated beams are received by the optoelectronic receiver directly through the inner reference optical path. As before, a low frequency measurement signal and a low frequency reference signal are generated in the optoelectronic receiver. While this system eliminates the disadvantages of the above-described mechanical converting device, the energy of the modulated beams emitted to the object to be measured through the outer optical measurement path is decreased because a portion of the modulated beams are divided into the inner reference optical path thereby affecting the measurement ability of the device for optoelectronic distance measurement.

The emitter currently used in the optoelectronic range finder is generally a semiconductor laser which uses semiconductor material as the working medium. The semiconductor materials generally include GaAs, Cds and Zns. There are three actuation modes, that is, electronic injection, electron-beam actuation, and optical pumping. Referring to FIGS. 1 and 2, FIG. 1 shows the inner core structure of an exemplary GaAs semiconductor laser and FIG. 2 shows the package structure of an exemplary GaAs semiconductor laser which includes the working medium, resonant chamber, and pumping source. The working medium refers to the GaAs semiconductor material with a band gap itself, which is also called a PN junction. The resonant chamber generally comprises two parallel planes which are vertical to the PN junction plane, the two planes are usually used as cleavage planes of the semiconductor crystal and may be polished, and the remaining two sides of planes are relatively rough and used for eliminating the action of the laser in other directions except for the main direction. The pumping source is the current that is fed by the PN junction.

FIG. 3 shows the principle of operation for the exemplary semiconductor laser. In this regard, the semiconductor laser achieves an inversion distribution of the particle beam, and generates stimulated radiation, by feeding current into the semiconductor PN junction, and achieves the optical amplification so as to generate laser oscillation by means of the positive feedback of the resonant chamber. As the resonant chamber of the semiconductor laser is formed via the cleavage planes of the semiconductor and the cleavage planes usually have a reflectance of 35%, it is enough to induce laser oscillation. If the reflectance needs to be increased, a silicon dioxide coating may be plated on the crystal face, and then a metal coating (silver) is plated additionally thereof, thereby achieving a reflectance of more than 95%, thus the two cleavage planes may both emit laser light. In the current practice, the distance is measured by the laser beam emitted from one of the two cleavage planes which is called the main laser beam. In order to make sure that the output of the power of the main laser beam is not affected by the temperature change and voltage fluctuation, automatic compensation control for the power of the main laser beam is currently achieved by monitoring the luminous intensity of the laser beam emitted from the other cleavage plane which is called the compensating laser beam. A photodiode is presently added in the laser module to monitor the compensation laser beam, and the output power of the main laser beam is controlled to be constant by an external member. FIG. 4 shows the semiconductor laser module in the prior art, wherein the laser module includes a laser diode (LD) and a photodiode (PD) wherein the two cleavage planes of the laser diode respectively emit the main laser beam and the compensation laser beam while the photodiode is used to monitor the luminous intensity of the compensation laser beam.

SUMMARY

In order to overcome the deficiencies in the prior art, hereinafter is described an optoelectronic range finder which has a high measurement ability that is provided without the use of a mechanical converting device.

More particularly, the subject optoelectronic range finder includes: an emitter with a first end for emitting a measuring light beam onto an object to be measured and a second end; a receiver for receiving the measuring light beam reflected or dispersed by the object to be measured and for converting the received light to a measurement signal; a signal processing device for filtering the measurement signal and a reference signal; and a control and analysis device for analyzing the information associated with the measurement signal and the reference signal so as to determine the distance of the object to be measured, wherein the second end of the emitter is used to emit a reference beam which is received by the receiver and converted to the reference signal. The described optoelectronic distance measurement device would thus perform the steps of: emitting a measuring light beam from a first end of an emitter onto a object to be measured where the measuring light beam is reflected or dispersed by the object to be measured; receiving the measuring light beam so reflected or dispersed by the object to be measured and converting it into a measurement signal; processing the measurement signal and comparing it with a reference signal; and determining the distance of the object to be measured based on the information of the measurement signal and the reference signal, wherein another reference light beam is emitted from a second end of the emitter, which is received and converted into the reference signal.

In the optoelectronic range finder and the method hereinafter described, a measuring beam and a reference beam are emitted from the first end and the second end of the emitter respectively whereby a measurement signal and a reference signal are correspondingly generated in the receiver and the distance of the object to be measured is determined based on the information of the measurement signal and the reference signal. In contrast to the prior art, the hereinafter described optoelectronic range finder needs no additional mechanical converting device and will not decrease the energy of the measuring beam emitted onto the object to be measured, thereby simplifying the structure of the measurement device and enhancing the accuracy of the measuring device.

BRIEF DESCRIPTION OF THE DRAWINGS

A preferred optoelectronic range finder will be in detail below in conjunction with the accompanied drawings in which.

DETAILED DESCRIPTION

Figure 1:
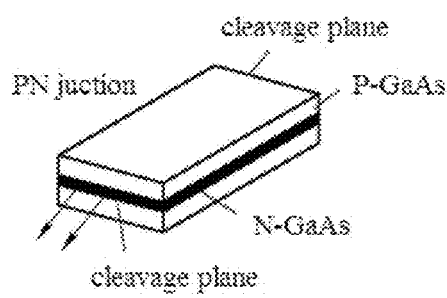
FIG. 1 is a schematic view of the inner core structure of a prior art GaAs semiconductor laser.
Figure 2:
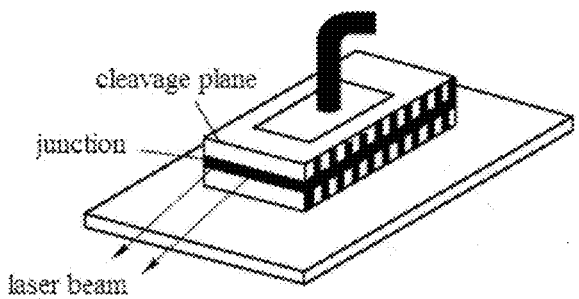
FIG. 2 is a schematic view of the package structure of the GaAs semiconductor laser of FIG. 1.
Figure 3:
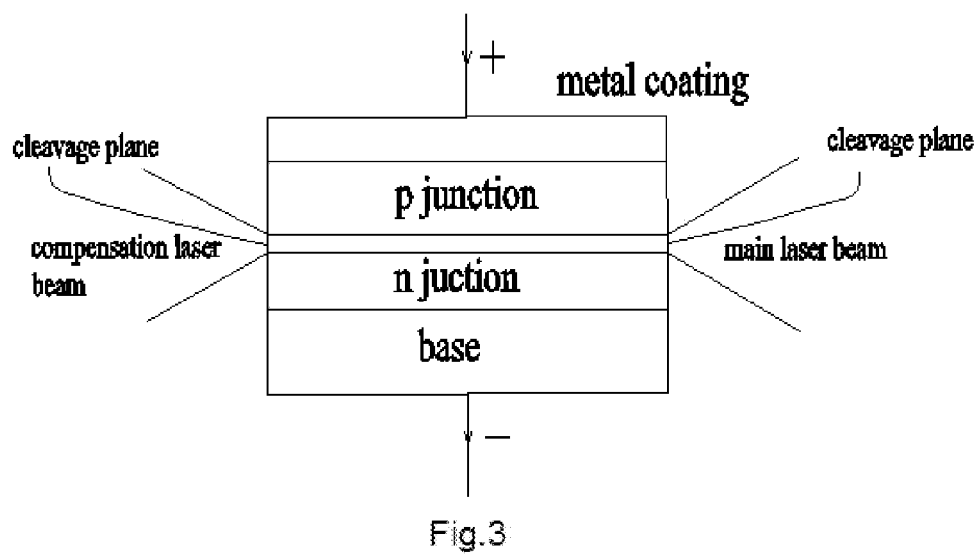
FIG. 3 is a schematic view of the principle of operation of the GaAs semiconductor laser of FIG. 1.
Figure 4:
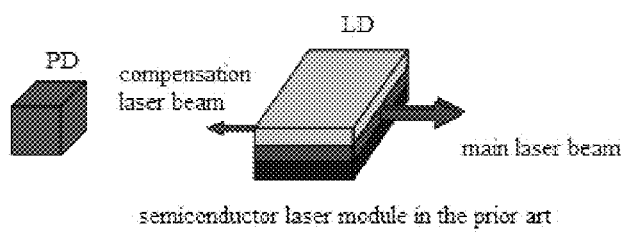
FIG. 4 is a schematic view of a prior art semiconductor laser module.
Figure 5:
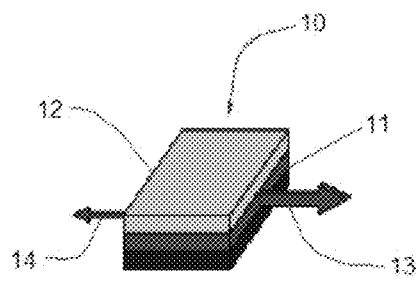
FIG. 5 is a schematic view of an exemplary semiconductor laser with double laser beams constructed according to the description that follows.

An optoelectronic range finder, which is also referred to as a device for optoelectronic distance measurement, uses a semiconductor laser with double laser beams as an optical signal emitter. As shown in FIG. 5, which is a schematic view of an exemplary semiconductor laser with double laser beams constructed according to one preferable embodiment, the semiconductor laser 10 with double laser beams emits a main laser beam 13 and a compensation laser beam 14 at the two cleavage planes 11, 12. The main laser beam 13 as the measuring beam is projected onto an object to be measured through an outer optical measurement path, and the compensation laser beam 14 is projected onto the optoelectronic receiver through an inner reference optical path. In the present embodiment, a photodiode (PD) for monitoring the power of the laser is omitted, and windows through which the main laser beam 13 and the compensating laser beam 14 can be projected outward are provided at the exterior of the semiconductor laser 10 corresponding to the position of the two cleavage planes 11, 12. In contrast to the prior art where the laser emits a laser beam at only one end, in the present embodiment, the semiconductor laser 10 with double laser beams emit a laser beam at each of its two ends.

Figure 6:
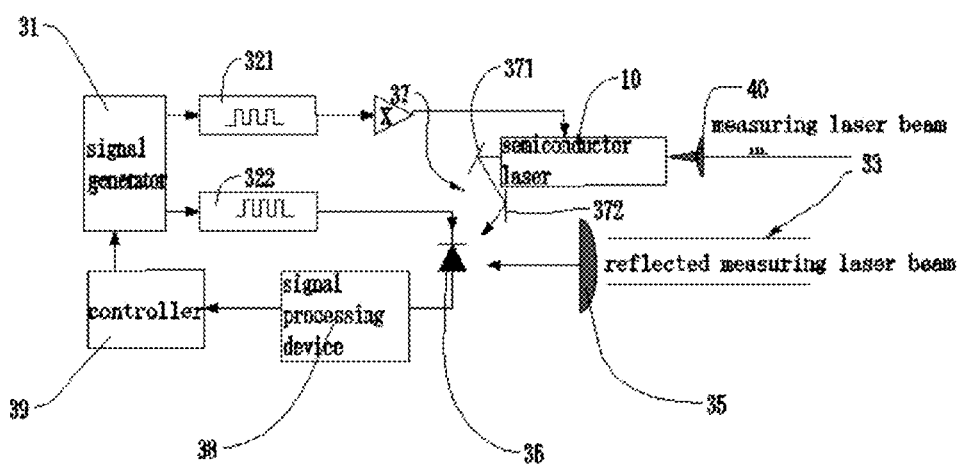
FIG. 6 is a view of an exemplary distance measurement device incorporating the optoelectronic range finder of the semiconductor laser with double laser beams of FIG. 5.

FIG. 6 is a view of a distance measurement device incorporating the device for optoelectronic distance measurement of the semiconductor laser with double laser beams shown in FIG. 5. The semiconductor laser 10 emits at its one end the main laser beam 13, i.e., the measuring laser beam, which is projected onto an object to be measured (not shown) through an outer measurement path 33 after being collimated by a collimating optical element 40. Then, the reflected measuring laser beam reflected or dispersed back from the object to be measured is received by an optical receiving element 35 and transmitted to an optoelectronic receiver 36. The semiconductor laser 10 also emits a compensation laser beam 14 at the other end, i.e., the reference laser beam, which is directed to an optoelectronic receiver 36 through a pair of reflex elements 371, 372. The path that the reference laser beam 14 passes through from the reflex elements 371, 372 to the optoelectronic receiver 36 forms the well-known inner reference optical path 37.

A high frequency modulated signal 321 is transmitted to the semiconductor laser 10 so as to modulate the amplitude of the laser beam, which is generated by a signal generator 31 and output to the semiconductor laser 10 with double laser beams to modulate the laser beam emitted from the laser 10. With the laser beam modulated by the high frequency modulated signal 321, the reflected measuring laser beam received by optoelectronic receiver 36 through the outer measuring path generates a high frequency measurement signal in the optoelectronic receiver 36. The signal generator 31 also generates a similar high frequency signal 322 which is transmitted to the optoelectronic receiver 36 through a connection lead. The high frequency measurement signal in the optoelectronic receiver 36 and the high frequency signal 322 are mixed so as to generate a low frequency measurement signal. In this example, the optoelectronic receiver 36 takes the form of an avalanche photodiode and may also be used as a mixer. If a common optoelectronic receiver is used, an additional mixer element can be used for mixing the high frequency measurement signal and the high frequency signal. Similarly, the high frequency reference signal received by the optoelectronic receiver 36 through the inner reference optical path 37 and the high frequency signal 322 are mixed to generate a low frequency reference signal. Certainly, it is easily conceivable for the skilled person in the art that alternatives may be used for receiving the high frequency reference signal.

The low frequency reference signal and the low frequency measurement signal generated successively in the optoelectronic receiver 36 are transmitted to a signal processing device 38 to be processed. Generally, in the signal processing device 38, the low frequency measurement signal and the low frequency reference signal are amplified and filtered, thereby generating a low frequency measurement signal and a low frequency reference signal containing phase or time information. In general, the signal is amplified by a transresistance amplifier and the high frequency signal part of the signal is filtered by a low pass filter. The low frequency measurement signal and the low frequency reference signal containing phase or time information that are processed by the signal processing device 38 are further transmitted to the controller 39 which determines the distance from the device for optoelectronic distance measurement to the object to be measured based on the information of the low frequency measurement signal and the low frequency reference signal.

Figure 7:
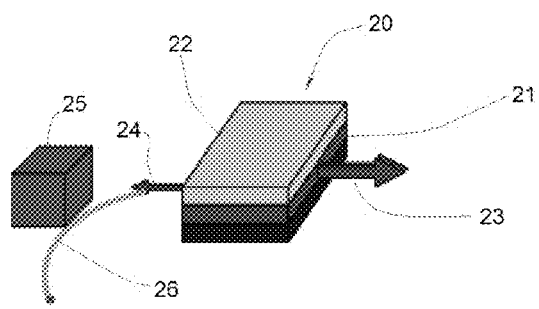
FIG. 7 is a schematic view of a semiconductor laser with double laser beams that is constructed according to another described embodiment.
Figure 8:
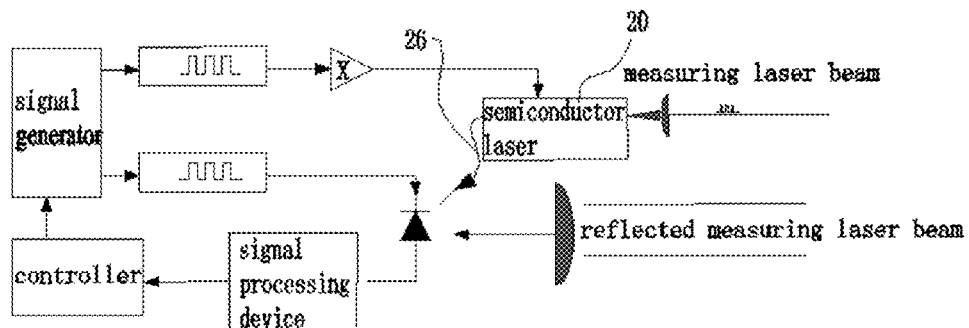
FIG. 8 is a view of a distance measurement device incorporating the optoelectronic range finder of the semiconductor laser with double laser beams of FIG. 7.

FIG. 7 is a schematic view of the semiconductor laser with double laser beams according to another preferable embodiment. In this embodiment, the semiconductor laser 20 with double laser beams emits a main laser beam 23 and a compensation laser beam 24 at the two cleavage planes 21, 22. The main laser beam 23 as measuring beam is projected onto an object to be measured through an outer optical measurement path, and the compensation laser beam 24 is transmitted to a photodiode 25 which controls the output power of the main laser beam 23 to be constant by monitoring the compensation laser beam 24. In this embodiment, a portion of the compensation laser beam 24 as reference beam is directed to the optoelectronic receiver by an optical fiber 26. FIG. 8 is a view of an exemplary distance measurement device incorporating the device for optoelectronic distance measurement of the semiconductor laser with double laser beams shown in FIG. 7. The measurement principle is substantially the same as that in preceding embodiment, except that the semiconductor laser 20 with double laser beams emits the measuring laser beam 23 at one end, and at the other end is connected with the optical fiber 26 which leads from the laser 20 a portion of the compensation laser beam 24 as the reference beam. The reference beam transmitted through the optical fiber 26 is received by the optoelectronic receiver directly and generates a reference signal correspondingly. The path that the reference beam passes through from the optical fiber 26 to the optoelectronic receiver 36 constitutes the well-known inner reference optical path.

Preferably, a light adjustment valve is additionally arranged in the reference optical path in the above two embodiments of the present invention. The light valve may adjust the transmission rate, and thereby controls the intensity of the reference beam emitted at the other end of the laser.

The detailed embodiments described above are intended to illuminate the concepts and principles of the present invention rather than limit the scope of the invention herein after claimed. In this regard, those skilled in the art will appreciate that many other modifications and variations of these preferred embodiments may be made without departing from the spirit and the scope of the invention as defined in the following claims.

What is claimed is:

1. An optoelectronic range finder, comprising:
   an emitter having a first end for emitting a measuring beam to an object to be measured and a second end;
   a receiver for receiving the measuring beam as reflected or dispersed back from the object to be measured and for converting the received measuring beam into a low frequency measurement signal;
   a signal processing device for filtering the measurement signal and a reference signal; and
   a control and analysis device for analyzing information associated with the measurement signal and the reference signal so as to determine the distance from the object;
   wherein a reference beam is emitted from the second end of the emitter and is received by the receiver and converted to form the reference signal,
   wherein the reference signal is received through a known inner reference optical path,
   wherein the measuring beam and the reference signal are modulated by a high frequency modulated signal, and
   wherein the measurement beam and the reference signal are converted to the low frequency measurement signal and a low frequency reference signal by mixing with a high frequency signal.

2. The optoelectronic range finder according to claim 1, wherein the emitter is a semiconductor emitter.

3. The optoelectronic range finder according to claim 2, wherein the receiver is an optoelectronic receiver.

4. The optoelectronic range finder according to claim 3, wherein the reference beam is received by the receiver through a known inner reference optical path.

5. The optoelectronic range finder according to claim 4, wherein the inner reference optical path is provided via use of a reflex element.

6. The optoelectronic range finder according to claim 4, wherein the inner reference optical path is provided via use of an optical fiber which is coupled to the second end of the laser.

7. The optoelectronic range finder according to claim 5, wherein the inner reference optical path comprises a valve for adjusting an amount of light passage.

8. The optoelectronic range finder according to claim 6, wherein the inner reference optical path comprises a valve for adjusting an amount of light passage.

9. The optoelectronic range finder according to claim 1, wherein the range finder further comprises a signal generator for generating a modulated signal for the emitter.

10. The optoelectronic range finder according to claim 9, wherein the modulated signal is used to modulate an amplitude of the measuring beam and the reference beam.

11. A method for obtaining optoelectronic distance measurements, comprising:
   emitting a measuring beam from a first end of an emitter to an object to be measured which is reflected or dispersed from the object to be measured;
   receiving the measuring beam reflected or dispersed from the object to be measured and converting the received measuring beam into a measurement signal;
   processing the measurement signal and comparing it with a reference signal; and
   determining a distance to the object to be measured based on information associated with the measurement signal and the reference signal,
   wherein a reference beam is emitted from a second end of the emitter, which reference beam is received and converted to form the reference signal, wherein the reference beam is received through a known inner reference optical path, wherein the measuring beam and the reference beam are modulated by a high frequency modulated signal, and wherein the measurement signal and the reference signal are converted to a low frequency measurement signal and a low frequency reference signal by mixing with a high frequency signal.

12. An optoelectronic range finder, comprising:

an emitter having a first end for emitting a measuring beam to an object to be measured and a second end;

a receiver for receiving the measuring beam as reflected or dispersed back from the object to be measured and for converting the received measuring beam into a measurement signal;

a signal processing device for filtering the measurement signal and a reference signal; and a control and analysis device for analyzing information associated with the measurement signal and the reference signal so as to determine the distance from the object;

wherein a reference beam is emitted from the second end of the emitter and is received by the receiver and converted to form the reference signal and wherein the measurement signal and the reference signal are converted to a low frequency measurement signal and a low frequency reference signal by mixing with a high frequency signal.

13. The optoelectronic range finder according to claim 12, wherein the emitter is a semiconductor emitter.

14. The optoelectronic range finder according to claim 13, wherein the receiver is an optoelectronic receiver.

15. The optoelectronic range finder according to claim 12, wherein the range finder further comprises a signal generator for generating a modulated signal for the emitter.

16. The optoelectronic range finder according to claim 15, wherein the modulated signal is used to modulate an amplitude of the measuring beam and the reference beam.

17. A method for obtaining optoelectronic distance measurements, comprising:

emitting a measuring beam from a first end of an emitter to an object to be measured which is reflected or dispersed from the object to be measured;

receiving the measuring beam reflected or dispersed from the object to be measured and converting the received measuring beam into a measurement signal;

processing the measurement signal and comparing it with a reference signal; and determining a distance to the object to be measured based on information associated with the measurement signal and the reference signal;

wherein a reference beam is emitted from a second end of the emitter, which reference beam is received and converted to form the reference signal;

wherein the measurement signal and the reference signal are converted to a low frequency measurement signal and a low frequency reference signal by mixing with a high frequency signal.

* * * * *